(12) United States Patent
Honjo

(10) Patent No.: US 8,261,060 B2
(45) Date of Patent: Sep. 4, 2012

(54) CONTENT TRANSMITTING APPARATUS, CONTENT TRANSMITTING METHOD, AND CONTENT TRANSMITTING PROGRAM

(75) Inventor: Ryoki Honjo, Kanagawa (JP)

(73) Assignee: Sony Corporation, Tokyo (JP)

( * ) Notice: Subject to any disclaimer, the term of this patent is extended or adjusted under 35 U.S.C. 154(b) by 260 days.

(21) Appl. No.: 12/721,157

(22) Filed: Mar. 10, 2010

(65) Prior Publication Data
US 2010/0262822 A1 Oct. 14, 2010

(30) Foreign Application Priority Data
Apr. 13, 2009 (JP) ................................. 2009-097205

(51) Int. Cl.
*H04L 9/00* (2006.01)
(52) U.S. Cl. ........ 713/153; 713/189; 380/54; 365/49.17
(58) Field of Classification Search ............... 365/49.17; 713/153, 189; 380/54
See application file for complete search history.

(56) References Cited

U.S. PATENT DOCUMENTS
2005/0278548 A1* 12/2005 Lin et al. ........................ 713/189
2007/0217604 A1* 9/2007 Yanamoto ........................ 380/54
2008/0013726 A1* 1/2008 Kuriya et al. .................. 380/210

FOREIGN PATENT DOCUMENTS
JP 2005-51709 2/2005
* cited by examiner

*Primary Examiner* — Anh Phung
*Assistant Examiner* — Hai Pham
(74) *Attorney, Agent, or Firm* — Oblon, Spivak, McClelland, Maier & Neustadt, L.L.P.

(57) ABSTRACT

A content transmitting apparatus, includes: an acquisition device configured to acquire content data distributed in streaming mode; a temporary storage device configured to store temporarily the content data acquired by the acquisition device; a data control device configured to read the content data from the temporary storage device on a first-in first-out basis; an encryption device configured to encrypt in units of a predetermined amount the content data read out by the data control device; and a transmission device configured to transmit the content data encrypted by the encryption device to a predetermined receiving apparatus via a network. If the remaining capacity of the temporary storage device becomes smaller than a predetermined threshold value depending on status of the network, then the data control device discards the content data read from the temporary storage device.

12 Claims, 9 Drawing Sheets

CONTENT TRANSMITTING APPARATUS, CONTENT TRANSMITTING METHOD, AND CONTENT TRANSMITTING PROGRAM

BACKGROUND OF THE INVENTION

1. Field of the Invention

The present invention relates to a content transmitting apparatus, a content transmitting method, and a content transmitting program. More particularly, the invention relates to a content transmitting apparatus, a content transmitting method, and a content transmitting program for transmitting content data distributed in streaming mode to receiving apparatuses such as recorders via a network.

2. Description of the Related Art

Recent years have witnessed growing acceptance of the so-called home network connecting household electrical appliances with a computer for communication therebetween.

This type of network typically involves getting a content transmitting apparatus to receive content data distributed in streaming mode from broadcasting stations and to transmit the received content data to receiving apparatuses such as a display device and a recorder via the network, whereby the received content data is stored.

In many cases, content data is offered in digitized form. Such digital content data is relatively easy to copy or tamper with.

To forestall such eventualities, content data is typically transmitted to the home network in a copyright-protected manner according to DTCP-IP (Digital Transmission Content Protection over Internet Protocol), an adaptation of DTCP (Digital Transmission Content Protection) developed by DTLA (Digital Transmission Licensing Administrator) to IP (Internet Protocol) interfaces.

When transmitting content data in streaming mode to receiving apparatuses, the content transmitting apparatus generally utilizes RTP (Real Time Protocol)/UDP (User Datagram Protocol). The protocols allow the content transmitting apparatus to transmit content data at high speeds to the receiving apparatuses.

On the home network, meanwhile, household electrical appliances are connected increasingly with a computer under HTTP (Hyper Text Transmission Protocol)/TCP (Transmission Control Protocol), as proposed by DLNA (Digital Living Network Alliance).

In this case, the content transmitting apparatus transmits content data under HTTP/TCP so that the data may be transmitted to the receiving apparatuses in highly reliable fashion.

If any receiving apparatus fails to receive the content data, then that receiving apparatus transmits a retransmission request to the content transmitting apparatus. In such a case, it takes time for the content transmitting apparatus to retransmit the content data. The retransmission can result in a delay of the content data being transmitted in streaming mode.

Some content transmitting apparatuses incorporate a buffer to accommodate the content data being distributed by a broadcasting station. When a predetermined amount of content data has been accumulated following the last occurrence of a delay, the accumulated content data is discarded to ensure required levels of real-time performance. One such content transmitting apparatus is proposed in Japanese Patent Laid-open No. 2005-51709.

SUMMARY OF THE INVENTION

When content data is encrypted by the above-mentioned type of content transmitting apparatus in AES (Advanced Encryption Standard)-CBC mode according to DTCP-IP for transmission to the receiving apparatus, part of the encrypted content data might be discarded.

In this case, even after receiving the part of the encrypted content data which is not discarded by the content transmitting apparatus, the receiving apparatus cannot decrypt the discarded and subsequent parts of the content data.

As a result, the receiving apparatus may be subject to deterioration in picture quality and may even develop malfunctions. Thus the content transmitting apparatus cannot be said to transmit content data in a manner suitable for the network.

The present embodiment has been made in view of the above circumstances and provides a content transmitting apparatus, a content transmitting method, and a content transmitting program for transmitting content data in a manner suitable for the network.

In carrying out the present invention and according to one embodiment thereof, there is provided a content transmitting apparatus including: an acquisition device; a temporary storage device; a data control device; an encryption device; and a transmission device. The acquisition device is configured to acquire content data distributed in streaming mode. The temporary storage device is configured to store temporarily the content data acquired by the acquisition device. The data control device is configured to read the content data from the temporary storage device on a first-in first-out basis. The encryption device is configured to encrypt in units of a predetermined amount the content data read out by the data control device. The transmission device is configured to transmit the content data encrypted by the encryption device to a predetermined receiving apparatus via a network. If the remaining capacity of the temporary storage device becomes smaller than a predetermined threshold value depending on status of the network, then the data control device discards the content data read from the temporary storage device.

According to another embodiment of the present invention, there is provided a content transmitting method including the steps of: acquiring; temporarily storing; data controlling; encrypting; and transmitting. The acquiring step acquires content data distributed in streaming mode. The temporarily storing step stores temporarily the content data acquired in the acquiring step into a temporary storage device. The data controlling step reads the content data from the temporary storage device on a first-in first-out basis. The encrypting step encrypts in units of a predetermined amount the content data read out in the data controlling step. The transmitting step transmits the content data encrypted in the encrypting step to a predetermined receiving apparatus via a network. If the remaining capacity of the temporary storage device becomes smaller than a predetermined threshold value depending on status of the network, then the data controlling step involves discarding the content data read from the temporary storage device.

According to a further embodiment of the present invention, there is provided a recording medium which stores a content transmitting program for causing a computer to execute a process including the steps of: acquiring; temporarily storing; data controlling; encrypting; and transmitting. The acquiring step acquires content data distributed in streaming mode. The temporarily storing step stores temporarily the content data acquired in the acquiring step into a temporary storage device. The data controlling step reads the content data from the temporary storage device on a first-in first-out basis. The encrypting step encrypts in units of a predetermined amount the content data read out in the data controlling step. The transmitting step transmits the content data encrypted in the encrypting step to a predetermined receiving apparatus via a network. If the remaining capacity of the temporary storage device becomes smaller than a predetermined threshold value depending on status of the network, then the data controlling step involves discarding the content data read from the temporary storage device.

Where the present invention is embodied as outlined above, if the remaining capacity of the temporary storage device becomes smaller than the predetermined threshold value due to a delay of the content data being transmitted to the receiving apparatus, the delay being attributable to network status, then the stored content data may be discarded before being encrypted.

According to the present embodiment, as outlined above, if the delay of the content data being transmitted to the receiving apparatus renders the remaining capacity of the temporary storage device smaller than the predetermined threshold value, the delay resulting from network status, then the content data may be discarded before being encrypted. Thus the present embodiment, when practiced as outlined illustratively above, provides a content transmitting apparatus, a content transmitting method, and a content transmitting program capable of transmitting content data in keeping with network status.

BRIEF DESCRIPTION OF THE DRAWINGS

Further objects and advantages of the present invention will become apparent upon a reading of the following description and appended drawings in which.

DETAILED DESCRIPTION OF THE PREFERRED EMBODIMENTS

Figure 1:
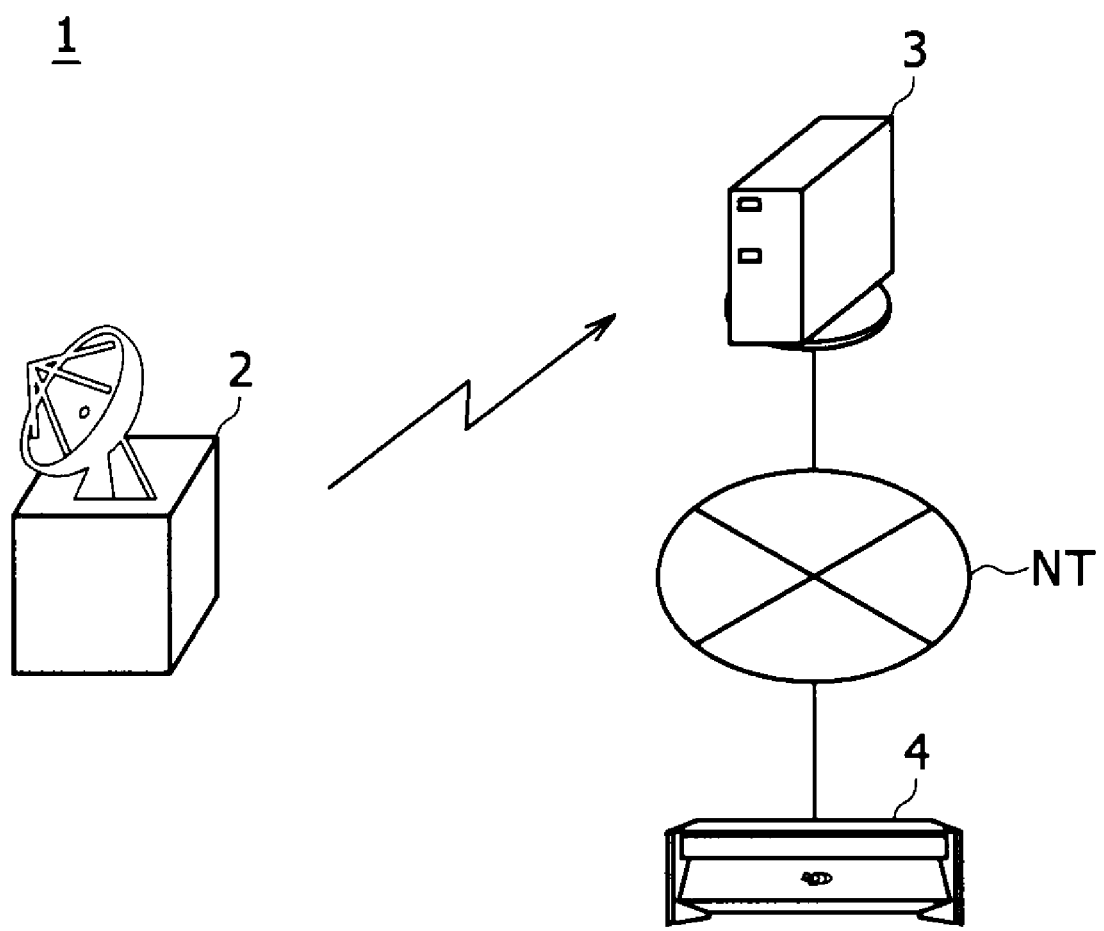
FIG. 1 is a schematic view showing a typical configuration of a content transmitting system.

Some preferred embodiments of the present invention will now be described. The description will be given under the following headings:
1. First embodiment
2. Second embodiment
3. Third embodiment
4. Fourth embodiment
5. Other variations 1. First Embodiment

[1-1. Configuration of the Content Transmitting System]

As shown in FIG. 1, a content transmitting system 1 is made up of a broadcasting station 2, a content transmitting apparatus 3 such as a set-top box, and a receiving apparatus 4 such as a recorder. The content transmitting apparatus 3 is connected with the receiving apparatus 4 by way of a network NT. The content transmitting apparatus 3 and receiving apparatus 4 comply illustratively with the DLNA standard and may be interconnected via the network NT in accordance with that standard.

The content transmitting apparatus 3 tunes in to and encrypts or similarly processes broadcast data coming from the broadcasting station 2. The encrypted broadcast data is transmitted by the content transmitting apparatus 3 to the receiving apparatus 4 via the network NT.

The receiving apparatus 4 receives the content data transmitted from the content receiving apparatus 3 via the network NT. Upon receipt of the content data, the receiving apparatus 4 encrypts or similarly processes the received data for storage.

[1-2. Structures of the Content Transmitting System]

Figure 2:
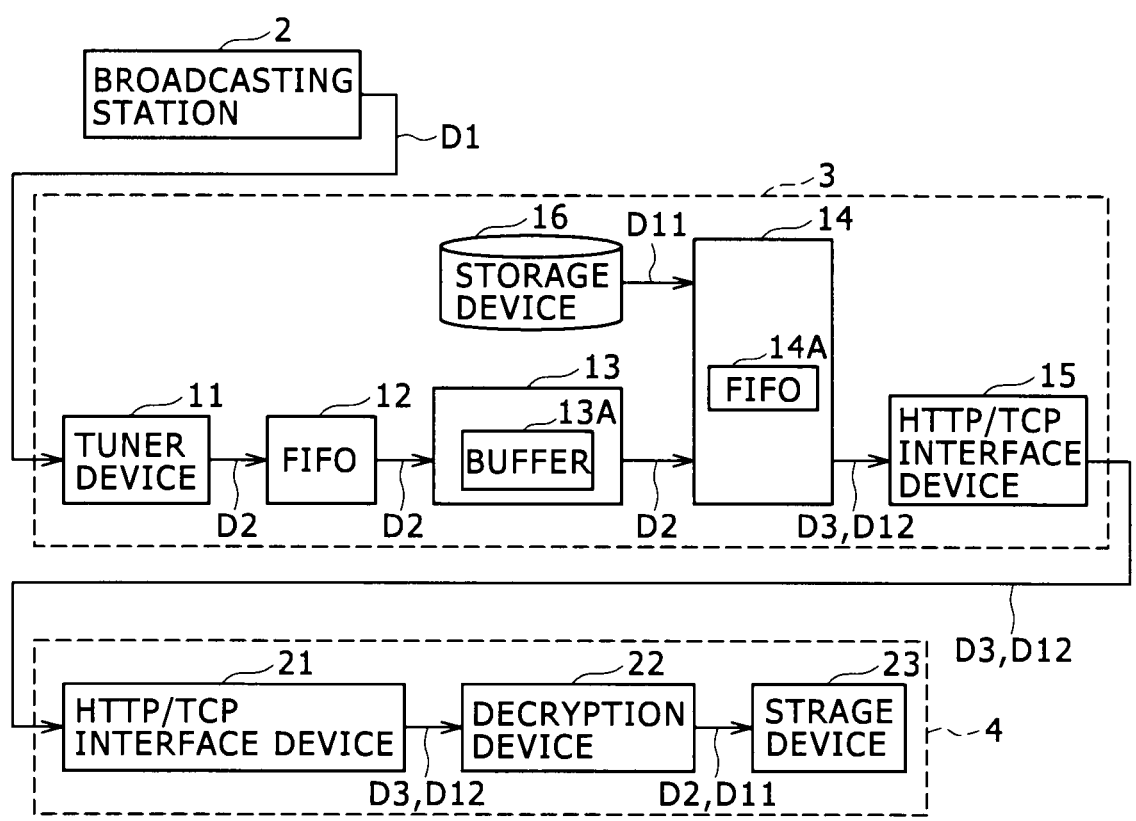
FIG. 2 is a schematic view showing a typical functional structure of the content transmitting system.

Explained below with reference to FIG. 2 is how the content transmitting apparatus 3 and receiving apparatus 4 are structured within the content transmitting system 1.

The content transmitting apparatus 3 includes a tuner device 11, an FIFO (First-In First-Out) queue 12, a data control device 13, an encryption device 14, an HTTP/TCP interface device 15, and a storage device 16.

The receiving apparatus 4 includes an HTTP/TCP interface device 21, a decryption device 22, and a storage device 23.

The content transmitting apparatus 3 has the tuner device 11 receiving via an antenna (not shown) broadcast data D1 including content data D2 distributed by the broadcasting station 2. From the broadcast data D1 thus received, the content transmitting apparatus 3 extracts the content data D2 corresponding to the broadcast channel of interest.

After the extraction, the tuner device 11 writes the extracted content data D2 to the FIFO queue 12. The FIFO queue 12 stores successively the content data D2 fed from the tuner device 11.

In keeping with a data discarding process, to be discussed later, the data control device 13 reads the content data D2 from the FIFO queue 12 on a first-in first-out basis and places the retrieved data into a buffer 13A. If it is found possible to write the content data D2 from the buffer 13A to a FIFO queue 14A of the encryption device 14, the data control device 13 reads the content data D2 from the buffer 13A and writes the retrieved data D2 to the FIFO queue 14A.

The encryption device 14 encrypts, in AES-CBC mode based on the DTCP-IP standard, the content data D2 written to the FIFO queue 14A. The encryption device 14 proceeds to output the encrypted data D3 to the HTTP/TCP interface device 15.

Where the content data D2 is to be encrypted in AES-CBC mode, the encryption device 14 encrypts as a payload the data D2 the size of an integer multiple of 16 bytes constituting the block size for AES-CBC mode in accordance with the DTCP-IP standard.

The encryption device 14 generates a PCP (Protected Content Packet) by adding a header to the payload obtained through encryption. The PCP thus generated is sent to the HTTP/TCP interface device 15 as the encrypted data D3.

Meanwhile, the encryption device 14 performs beforehand authentication and key exchange (AKE) with the receiving apparatus 4 by way of the HTTP/TCP interface device 15. Using the content key thus acquired for encryption, the encryption device 14 encrypts the content data D2.

Every time the encrypted data D3 is fed from the encryption device 14 in units of a PCP, the HTTP/TCP interface device 15 outputs the encrypted data D3 to the receiving apparatus 4 using HTTP/TCP.

In turn, the receiving apparatus 4 receives through the HTTP/TCP interface device 21 the encrypted data D3 coming from the content transmitting apparatus 3, and sends the encrypted data D3 thus received to the decryption device 22.

The decryption device 22 performs beforehand authentication and key exchange with the content transmitting apparatus 3 by way of the HTTP/TCP interface device 21 in order to acquire a content key for decryption purposes. Using the content key thus acquired, the decryption device 22 decrypts the encrypted data D3. The decryption device 22 outputs to the storage device 23 the content data D2 obtained by decrypting the encrypted data D3.

The storage device 23 decodes the content data D2 supplied from the decryption device 22. At the same time, the storage device 23 records the decoded content data D2.

Meanwhile, the content transmitting apparatus 3 has the encryption device 14 encrypting previously recorded content data D11 in the storage device 16 using the content key. The resulting encrypted data D12 is output through the HTTP/TCP interface device 21 to the receiving apparatus 4.

In the receiving apparatus 4, at this point, the decryption device 22 using the content key decrypts the encrypted data D12 received through the HTTP/TCP interface device 21. The content data D11 obtained through the decryption is stored into the storage device 23.

In the manner described above, the content transmitting apparatus 3 using HTTP/TCP can transmit the content data D2 in real-time streaming mode to the receiving apparatus 4 via the network NT, the content data D2 being distributed by the broadcasting station 2. Concurrently, the content transmitting apparatus 3 using HTTP/TCP may transmit the content data D11 to the receiving apparatus 4 via the network NT, the content data D11 having been stored in the storage device 16.

Meanwhile, the content transmitting apparatus 3 using HTTP/TCP transmits the encrypted data D3 to the receiving apparatus 4 via the network NT. Thus if the content transmitting apparatus 3 cannot transmit the encrypted data D3 to the receiving apparatus 4 for some reason, the receiving apparatus 4 makes a retransmission request to the content transmitting apparatus 3 so that the latter may retransmit the requested encrypted data D3.

Upon retransmission of the encrypted data D3, the content transmitting apparatus 3 delays transmitting the data D3.

Illustratively, the FIFO queue 12 has a capacity large enough to accommodate the content data D2 five times the payload length in size. If the transmission of the content data D2 is delayed due to a lowered transfer speed via the network NT, the FIFO queue 12 accumulates the content data D2 inside.

However, even if the FIFO queue 12 is large enough to accommodate the content data D2 five times the payload length in size, the content data D2 may still overflow depending on the level of network delay.

In such a case, the content transmitting apparatus 3 performs a data discarding process to discard the content data D2 in accordance with the size of the content data D2 being stored in the FIFO queue 12.

[1-3. Data Discarding Process]

The data discarding process performed principally by the data control device 13 will now be explained in detail.

The data control device 13 checks successively the remaining capacity of the FIFO queue 12. When the remaining capacity of the FIFO queue 12 is found larger than a predetermined threshold value, i.e., when the FIFO queue 12 still has room enough to accumulate the content data D2, the data control device 13 reads the content data D2 of the payload length to be encrypted by the encryption device 14, from the FIFO queue 12 into the buffer 13A.

The data control device 13 makes preparations for writing the content data D2 that was read from the FIFO queue 12 into the buffer 13A, to the FIFO queue 14A of the encryption device 14 on a predetermined time-out condition.

Illustratively, the time-out period may be set to 512 μs if the bit rate of the content data D2 is 30 Mbps and if the payload is 1,920 bytes long.

If the FIFO queue 14A of the encryption device 14 is found to have a remaining capacity large enough to accommodate the content data D2 of the payload length, then the data control device 13 writes the content data D2 to the FIFO queue 14A before a time-out occurs.

The encryption device 14 encrypts in AES-CBC mode the content data D2 of the payload length placed in the FIFO queue 14A. The encrypted data D3 resulting from the encryption is transmitted by the encryption device 14 to the receiving apparatus 4 via the HTTP/TCP interface device 15.

On the other hand, if there occurs a delay in the transmission of the encrypted data D3 illustratively because of a lowered transfer speed via the network NT, a time-out may occur before the content data D2 can be written to the FIFO queue 14A of the encryption device 14.

In this case, the data control device 13 discards the content data D2 of the payload length retrieved from the FIFO queue 12, without writing the data D2 to the FIFO queue 14A of the encryption device 14.

It might also happen that the remaining capacity of the FIFO queue 12 drops below a predetermined threshold value because a deteriorated transfer speed via the network NT prevents the encrypted data D3 from being transmitted in real time to the receiving apparatus 4. In this case, the data control device 13 reads and discards the content data D2 of the payload length to be encrypted by the encryption device 14, without writing the data D2 to the FIFO queue 14A.

[1-4. Data Discarding Routine]

Figure 3:
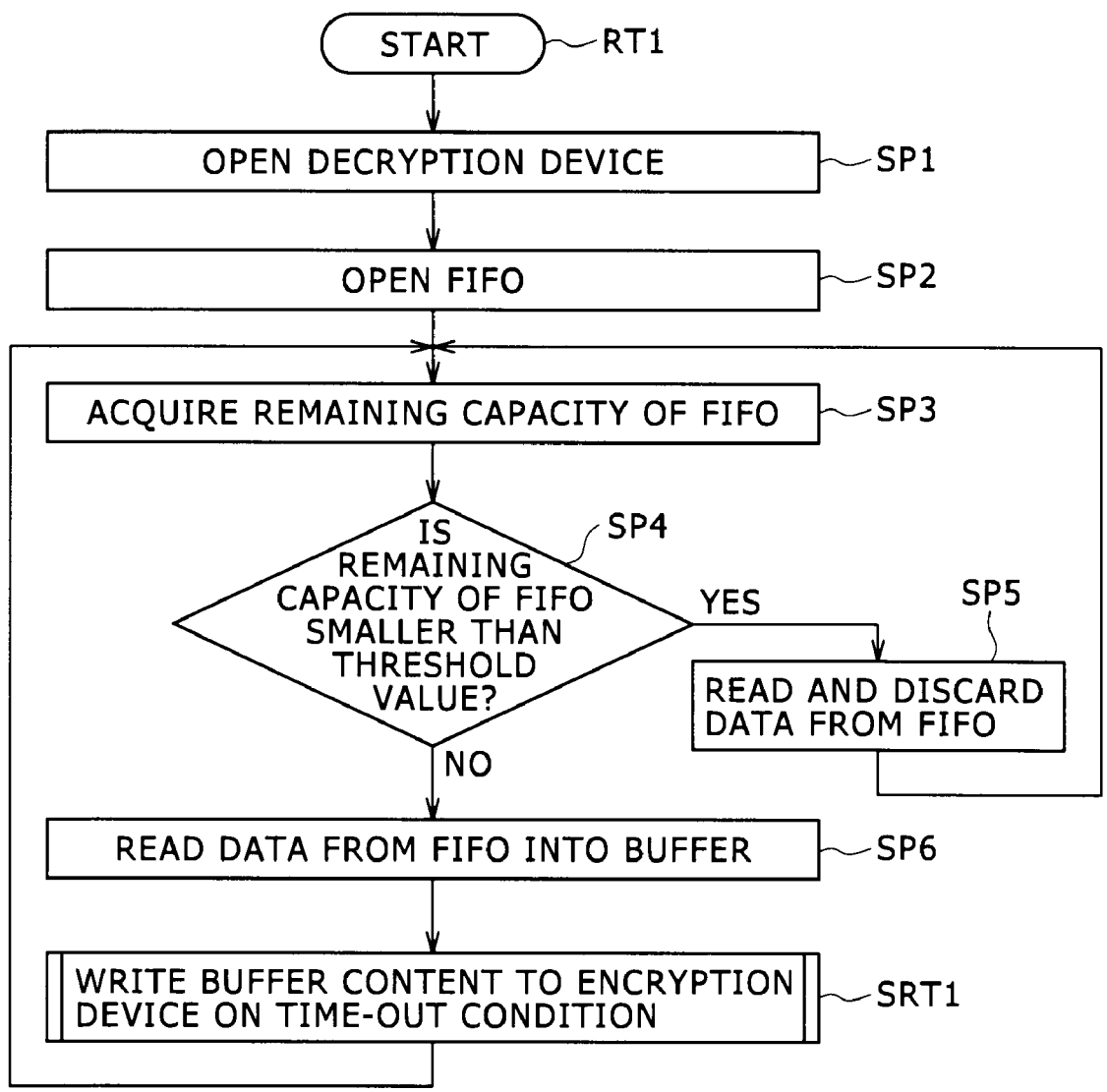
FIG. 3 is a flowchart explanatory of a data discarding routine.
Figure 4:
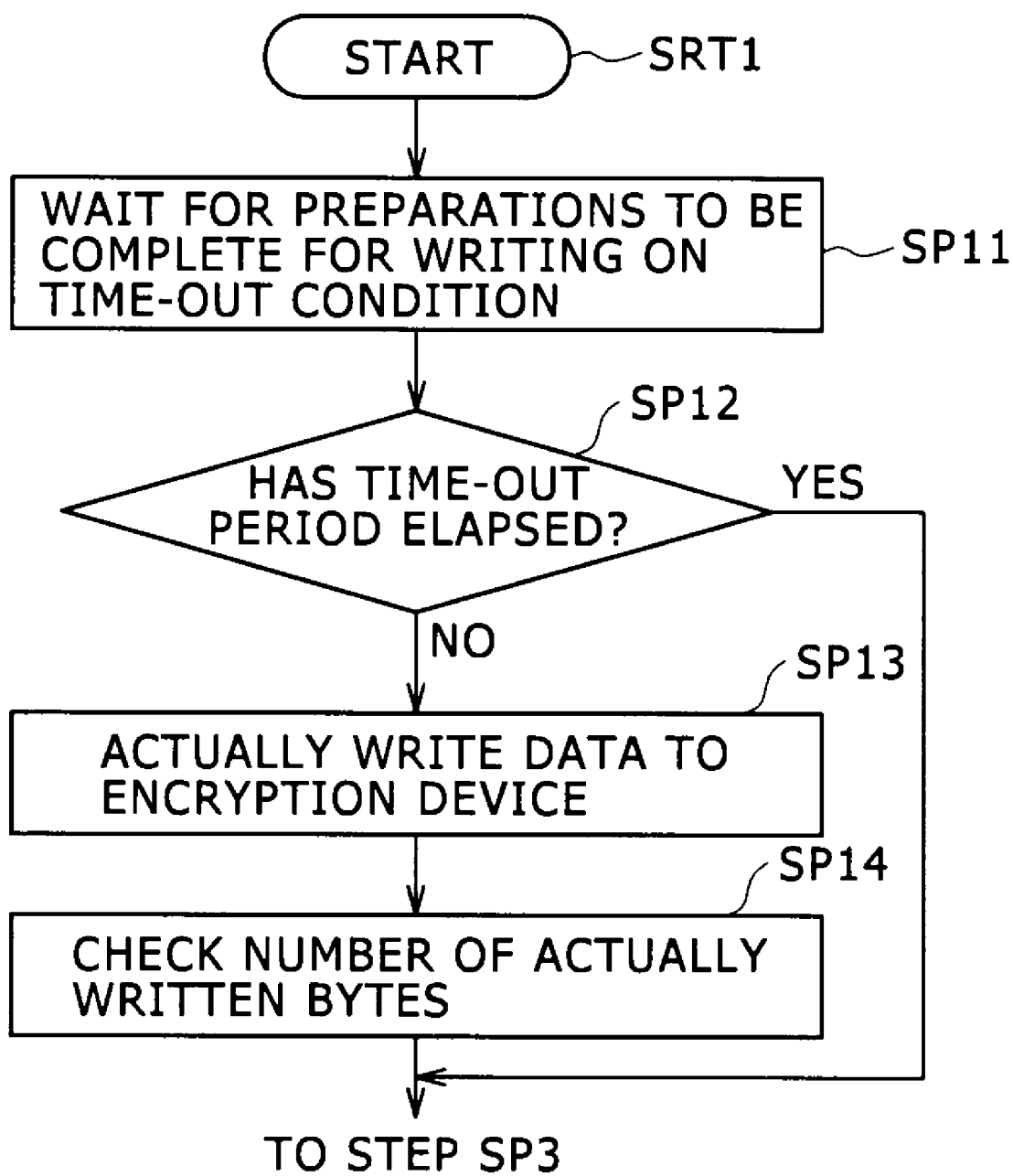
FIG. 4 is a flowchart explanatory of a write routine with a time-out condition.

Explained below in reference to the flowcharts of FIGS. 3 and 4 is the routine for carrying out the above-mentioned data discarding process. In practice, the data control device 13 starts up the data discarding routine and goes to step SP1.

In step SP1, the data control device 13 opens the encryption device 14 and goes to step SP2. In step SP2, the data control device 13 opens the FIFO queue 12 and goes to step SP3.

In step SP3, the data control device 13 acquires the remaining capacity of the FIFO queue 12 and goes to step SP4. In step SP4, the data control device 13 checks to determine whether the remaining capacity of the FIFO queue 12 obtained in step SP3 is smaller than a predetermined threshold value.

If the result of the check in step SP4 is affirmative, that means the remaining capacity of the FIFO queue 12 is less than the threshold value and that the encrypted data D3 cannot be transmitted in real time to the receiving apparatus 4 typically because of a lowered transfer speed via the network NT.

There is thus a possibility that the content data D2 distributed by the broadcasting station 2 and accumulated in the FIFO queue 12 can cause the FIFO queue 12 to overflow. In this case, the data control device 13 goes to step SP5.

In step SP5, the data control device 13 reads and discards from the FIFO queue 12 the content data D2 of the payload length about to be encrypted by the encryption device 14. With the content data D2 read from the FIFO queue 12 and discarded, the data control device 13 returns to step SP3.

On the other hand, if the result of the check in step SP4 is negative, that means the remaining capacity of the FIFO queue 12 is larger than the threshold value and that the content data D2 accumulated in the FIFO queue 12 will not overflow. In this case, the data control device 13 goes to step SP6.

In step SP6, the data control device 13 reads the content data D2 of the payload length to be encrypted by the encryption device 14, from the FIFO queue 12 into the buffer 13A. From step SP6, the control device 13 goes to a subroutine SRT1.

After starting up the subroutine SRT1 (FIG. 4), the data control device 13 goes to step SP11. In step SP11, the data control device 13 makes preparations for writing the content data D2 that was read from the FIFO queue 12 into the buffer 13A, to the FIFO queue 14A of the encryption device 14 on a predetermined time-out condition. From step SP11, the data control device 13 goes to step SP12.

In step SP12, the data control device 13 checks to determine whether a time-out has occurred upon elapse of a predetermined time period following the preparations made for writing the data in step SP11.

If the result of the check in step SP12 is affirmative, that means a time-out has occurred because a delay in the transmission of the encrypted data D3 to the receiving apparatus 4 prevented the content data D2 from being written to the FIFO queue 14A. At this point, the data control device 13 cannot written the content data D2 to the FIFO queue 14A and thus discards the content data D2 before returning to step SP3.

On the other hand, if the result of the check in step SP12 is negative, that means the content data D2 may be written to the FIFO queue 14A of the encryption device 14. In this case, the data control device 13 goes to step SP13.

In step SP13, the data control device 13 writes the content data D2 of the payload length that was read out in step SP6, to the FIFO queue 14A of the encryption device 14. From step SP13, the data control device 13 goes to step SP14.

In step SP14, the data control device 13 checks the number of the bytes making up the content data D2 written to the FIFO queue 14A of the encryption device 14. This step allows the data control device 13 to determine whether the content data D2 has been written without causing a write error. From step SP14, the data control device 13 returns to step SP3.

As described above, the data control device 13 writes the content data D2 to the FIFO queue 14A of the encryption device 14 if the remaining capacity of the FIFO queue 12 is larger than the threshold value and if the attempt to write the content data D2 to the FIFO queue 14A has not resulted in a time-out.

On the other hand, the data control device 13 discards the content data D2 without writing it to the FIFO queue 14A of the encryption device 14 if the remaining capacity of the FIFO queue 12 becomes less than the threshold value or if the attempt to write the content data D2 to the FIFO queue 14A has resulted in a time-out.

Figure 5:
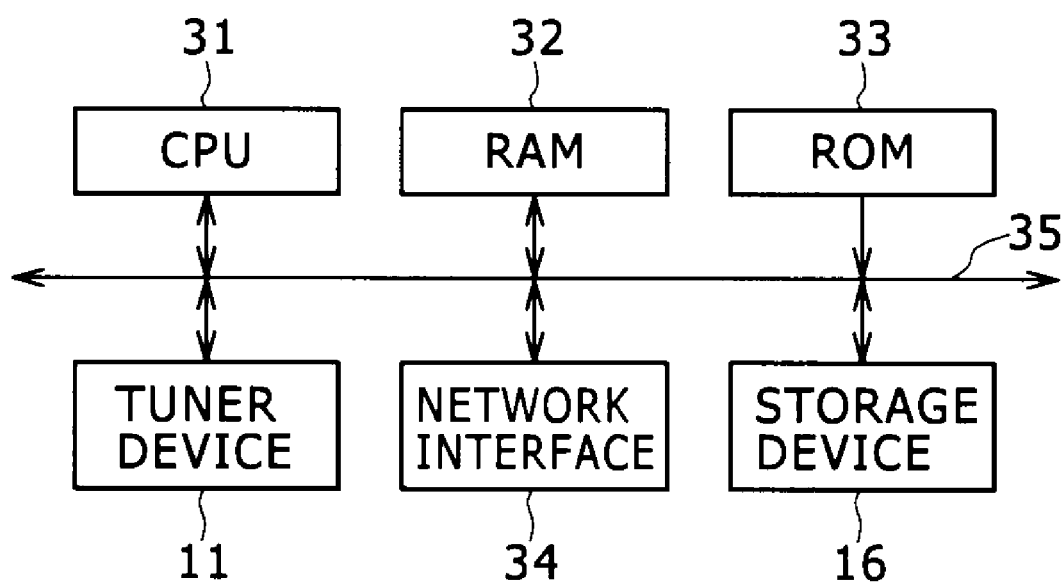
FIG. 5 is a schematic view showing a typical circuit structure of a content transmitting apparatus.

[1-5. Circuit Structure of the Content Transmitting Apparatus]

Where the above-described content transmitting apparatus 3 uses software to implement the FIFO queue 12, data control device 13, encryption device 14, and HTTP/TCP interface device 15, the hardware involved may be structured illustratively as shown in FIG. 5.

Specifically, the content transmitting apparatus 3 is constituted in hardware terms by a CPU (Central Processing Unit) 31, a RAM (Random Access Memory) 32, a ROM (Read Only Memory) 33, a tuner device 11, a network interface device 34 and a storage device 16, all interconnected via a bus 35.

In the content transmitting apparatus 3, the CPU 31 reads basic programs from the ROM 33, starts them up in the RAM 32, and controls all the components of the apparatus 3 accordingly. The CPU 31 also performs diverse application programs to carry out various processes.

Also in the content transmitting apparatus 3, the CPU 31 performs the above-mentioned series of steps by suitably controlling the RAM 32 to function as the FIFO queue 12, data control device 13, and encryption device 14. The CPU 31 also controls the network interface device 34 suitably to function as the HTTP/TCP interface device 15.

The CPU 31 reads a data discarding program from the ROM 33 into the RAM 32. By executing the data discarding program thus loaded in the RAM 32, the CPU 31 functions as the data control device 13 carrying out the data discarding process in accordance with the above-mentioned data discarding routine.

[1-6. Operations and Effects]

Structured as described above, the content transmitting apparatus 3 transmits to the receiving apparatus 4 the content data D2 distributed illustratively by the broadcasting station 2 using HTTP/TCP. During data transmission, the content transmitting apparatus 3 checks the remaining capacity of the FIFO queue 12 in which the content data D2 is accumulated by the data control device 13.

If the remaining capacity of the FIFO queue 12 is larger than the threshold value, then the data control device 13 reads from the FIFO queue 12 the content data D2 having the payload length formed by an integer multiple of 16 bytes constituting the block size in AES-CBC mode in compliance with the DTCP-IP standard.

The data control device 13 makes preparations for writing the content data D2 that was read from the FIFO queue 12, to the FIFO queue 14A of the encryption device 14 on a predetermined time-out condition. When a time-out has yet to occur, the data control device 13 writes the content data D2 to the FIFO 14A.

The content transmitting apparatus 3 then has the encryption device 14 encrypting the content data D2 in AES-CBC mode. The resulting encrypted data D3 is output to the receiving apparatus 4 through the HTTP/TCP interface device 15.

If the remaining capacity of the FIFO queue 12 is less than the threshold value, there is a possibility that the FIFO queue 12 may overflow. In that case, the data control device 13 reads and discards the content data D2 of the payload length from the FIFO queue 12.

When the content data D2 retrieved from the FIFO queue 12 is about to be written to the FIFO queue 14A of the encryption device 14 on the time-out condition, a time-out may actually occur. If that happens, the data control device 13 discards the content data D2 without writing it to the FIFO queue 14A.

Thus if there occurs a delay in the transmission of the encrypted data D3 due to status of the network NT, the content transmitting apparatus 3 gets the data control device 13 to discard the content data D2 before the encryption device 14 encrypts the content data D2.

As a result, the content transmitting apparatus 3 can forestall the possibility that when part of the encrypted data D3 is not transmitted to the receiving apparatus 4 but discarded, the rest of the encrypted data D3 having been transmitted to the receiving apparatus 4 cannot be decrypted thereby.

Also, the content transmitting apparatus 3 prevents the possibility of the receiving apparatus 4 developing malfunctions when only a part of the encrypted data D3 is transmitted to the apparatus 4. At the same time, the content transmitting apparatus 3 can avert the deterioration of picture quality caused by the impossibility of decrypting the encrypted data D3 having been transmitted.

Furthermore, there is no need for the content transmitting apparatus 3 to use different protocols in transmitting content data in different modes. With ordinary setups, by contrast, RTP/UDP would have to be used to transmit the content data D2 in streaming mode while HTTP/TCP would have to be utilized to transmit the content data D11 that is held in the storage device 16.

The content transmitting apparatus 3 can use the same protocol HTTP/TCP to transmit both the content data D2 in streaming mode and the content data D11 stored in the storage device 16. That means the content transmitting apparatus 3 may be structured simply and that the cost of developing the apparatus 3 can be reduced correspondingly.

When structured as described above, the content transmitting apparatus 3 stores into the FIFO queue 12 the content data D2 distributed in streaming mode, reads the data from there on a first-in first-out basis, and has the encryption device 14 encrypting the data before transmitting it to the receiving apparatus 4.

When the remaining capacity of the FIFO queue 12 becomes less than the threshold value depending on status of the network NT, the content transmitting apparatus 3 discards the content data D2 that has been read from the FIFO queue 12.

This enables the content transmitting apparatus 3 to discard the content data D2 as needed before its encryption, whereby the content data D2 can be transmitted in keeping with status of the network NT.

2. Second Embodiment

[2-1. Structure of the Content Transmitting Apparatus]

In the second embodiment of the present invention, the FIFO queue 12, data control device 13, and encryption device 14 are implemented by hardware.

In the first embodiment, it was explained above, these devices are implemented by software.

Figure 6:
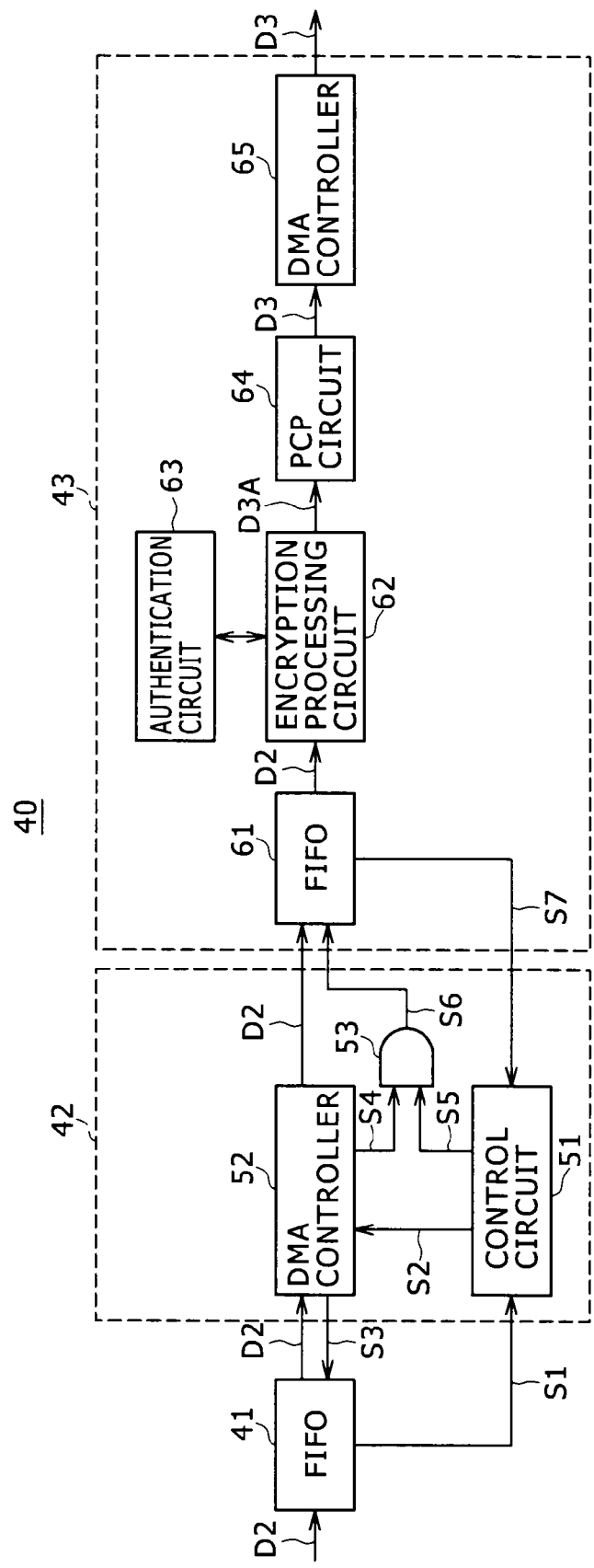
FIG. 6 is a schematic view showing the content transmitting apparatus as a second embodiment of the present invention.

In practice, a content transmitting apparatus 40 constituting the second embodiment includes a FIFO queue 41, a data control device 42, and an encryption device 43, each realized by hardware as shown in FIG. 6.

Incidentally, the content transmitting apparatus 40 constituting the second embodiment of the present invention is structurally the same as the content transmitting apparatus 3 making up the first embodiment (FIG. 2) except for the FIFO queue 41, data control device 42, and encryption device 43. For this reason, the components common to the two embodiments are omitted from the structure in FIG. 6.

The FIFO queue 41 is an asynchronous FIFO queue that successively stores the content data D2 fed from the tuner device 11. When the remaining capacity of the FIFO queue 41 becomes smaller than a predetermined threshold value, the FIFO queue 41 outputs an Almost_Full signal S1 to a control circuit 51 of the data control device 42.

The data control device 42 has the control circuit 51 controlling the apparatus 40 as a whole. At predetermined intervals, the control circuit 51 outputs a start signal S2 to a DMA (Direct Memory Access) controller 52.

At this point, the DMA controller 52 reads from the FIFO queue 41 the content data D2 the size of an integer multiple of 16 bytes constituting the block size to be encrypted in AES-CBC mode by the encryption device 43 located downstream.

Specifically, the DMA controller 52 outputs to the FIFO queue 41 a read increment signal S3 that functions as a clock signal. At a leading edge of the read increment signal S3, the DMA controller 52 reads the content data D2 from the FIFO queue 41.

The DMA controller 52 proceeds to output the retrieved content data D2 to a FIFO queue 61 of the encryption device 43. At the same time, the DMA controller 52 sends to a write enable circuit 53 a write increment signal S4 that functions as a clock signal.

The write enable circuit 53 computes the AND of the write increment signal S4 fed from the DMA controller 52 with a write enable signal S5 supplied from the control circuit 51, to be discussed later.

If the remaining capacity of the FIFO queue 61 is not large enough to accommodate the content data D2 of the payload length, then the FIFO queue 61 outputs a full signal S7 to the control circuit 51 of the data control device 42.

If neither the Almost_Full signal S1 from the FIFO queue 41 nor the full signal S7 from the FIFO queue 61 is supplied, then the control circuit 51 outputs to the write enable circuit 53 the write enable signal S5 indicative of "True."

Upon receipt of the write enable signal S5 indicative of "True" from the control circuit 51, the write enable circuit 53 sends the write increment signal S4 unmodified as a write increment signal S6 to the FIFO queue 61.

At this point, the DMA controller 52 can write the content data D2 to the FIFO queue 61 at a leading edge of the write increment signal S6, the content data D2 having been read from the FIFO queue 41.

On the other hand, if at least either the Almost_Full signal S1 from the FIFO queue 41 or the full signal S7 from the FIFO queue 61 is supplied, then the control circuit 51 outputs the write enable signal S5 indicative of "False" to the write enable circuit 53.

Upon receipt of the write enable signal S5 indicative of "False" from the control circuit 51, the write enable circuit 53 outputs the write increment signal S6 indicative of "False" to the FIFO queue 61. At this point, the DMA controller 52 cannot write the content data D2 read from the FIFO queue 41 to the FIFO queue 61.

That means the DMA controller 52 can discard the content data D2 retrieved from the FIFO queue 41 without writing it to the FIFO queue 61.

Incidentally, the control circuit 51 transfers the content data D2 in units of the payload length, from the FIFO queue 41 to the FIFO queue 61.

For this reason, if at least either the Almost_Full signal S1 from the FIFO queue 41 or the full signal S7 from the FIFO queue 61 is supplied, then the control circuit 51 sends the start signal S2 to the DMA controller 52 while outputting the write enable signal S5 indicative of "False" to the write enable circuit 53.

In the manner described above, the data control device 42 may either discard the content data D2 read from the FIFO queue 41 or transfer it to the FIFO queue 61 in units of the payload length.

Meanwhile, an authentication circuit 63 of the encryption device 43 performs authentication and key exchange with the receiving apparatus 4 by way of the HTTP/TCP interface device 15 in order to acquire a content key for encryption purposes. The authentication circuit 63 sends the content key thus acquired to an encryption processing circuit 62.

The encryption processing circuit 62 reads the content data D2 of the payload length from the FIFO queue 61. Using the content key supplied from the authentication circuit 63, the encryption processing circuit 62 encrypts the retrieved content data D2 in AES-CBC mode.

The encryption processing circuit 62 sends the encrypted data D3A obtained through encryption to a PCP circuit 64. The PCP circuit 64 regards the encrypted data D3A fed from the encryption processing circuit 62 as the payload, and adds a header to the payload to generate a header-equipped PCP as the encrypted data D3.

The DMA controller 65 reads the encrypted data D3 generated by the PCP circuit 64, and writes the encrypted data D3 thus retrieved to the RAM 32.

The encrypted data D3 written to the RAM 32 is transmitted by the CPU 31 (FIG. 5) to the receiving apparatus 4 through the HTTP/TCP interface device 15 using HTTP/TCP.

[2-2. Operations and Effects]

Structured as described above, the content transmitting apparatus 40 transmits to the receiving apparatus 4 the content data D2 being transmitted illustratively from the broadcasting station 2 using HTTP/TCP. During the transmission, the content transmitting apparatus 40 has the content data D2 stored temporarily in the FIFO queue 41.

The control circuit 51 of the data control device 42 sends the start signal S2 to the DMA controller 52. In so doing, the control circuit 51 causes the DMA controller 52 to read from the FIFO queue 41 the content data D2 of the payload length the size of an integer multiple of 16 bytes constituting the block size in AES-CBC mode.

Also, the DMA controller 52 reads the content data D2 from the FIFO queue 41 at a leading ledge of the read increment signal S3 and outputs the retrieved content data D2 to the FIFO queue 61. At the same time, the DMA controller 52 sends the write increment signal S4 to the write enable circuit 53.

The write enable circuit 53 computes the AND of the write increment signal S4 fed from the DMA controller 52 with the write enable signal S5 from the control circuit 51.

When it is found possible to write the content data D2 to the FIFO queue 61, the control circuit 51 sends the write enable signal S5 indicative of "True" to the write enable circuit 53. In turn, the write enable circuit 53 outputs to the FIFO queue 61 the write increment signal S4 fed from the DMA controller 52, as the write increment signal S6.

As a result, the DMA controller 52 writes the content data D2 at a leading edge of the write increment signal S6 sent from the write enable circuit 53.

Meanwhile, if the remaining capacity of the FIFO queue 41 becomes less than the predetermined threshold value, the FIFO queue 41 sends the Almost_Full signal S1 to the control circuit 51 of the data control device 42. If the remaining capacity of the FIFO queue 61 is not large enough to accommodate the content data D2 of the payload length, then the FIFO queue 61 outputs the full signal S7 to the control circuit 51 of the data control device 42.

If at least either the Almost_Full signal S1 from the FIFO queue 41 or the full signal S7 from the FIFO queue 61 is supplied, then the control circuit 51 outputs the write enable signal S5 indicative of "False" to the write enable circuit 53.

Upon receipt of the write enable signal S5 indicative of "False" from the control circuit 51, the write enable circuit 53 outputs the write increment signal S6 indicative of "False" to the FIFO queue 61. At this point, the DMA controller 52 cannot write the content data D2 read from the FIFO queue 41 to the FIFO queue 61.

That means the DMA controller 52 can discard the content data D2 retrieved from the FIFO queue 41 without writing it to the FIFO queue 61.

Thus if there occurs a delay in the transmission of the content data D2 due to status of the network NT using HTTP/TCP, the content transmitting apparatus 40 gets the data control device 42 to discard the content data D2 before the encryption device 43 encrypts the content data D2. As a result, the content transmitting apparatus 40 can transmit the content data D2 in keeping with status of the network NT.

The content transmitting apparatus 40 as the second embodiment offers the same effects as those provided by the content transmitting apparatus 3 constituting the first embodiment.

3. Third Embodiment

[3-1. Structure of the TV Set]

With the third embodiment of the present invention, unlike the first embodiment, the content data D2 is discarded or encrypted not in units of an integer multiple of 16 bytes constituting the block size for AES-CBC mode but in increments of an integer multiple of a TTS (Timestamped Transport Stream) packet. The structure of the third embodiment is the same as the first embodiment constituted by the content transmitting apparatus 3 (FIG. 2) and thus will not be discussed further.

As with the first embodiment, the content transmitting apparatus 3 as the third embodiment has the tuner device 11 receiving via an antenna the broadcast data D1 transmitted by the broadcasting station 2. From the broadcast data D1 thus received, the tuner device 11 extracts the content data D2 corresponding to a desired broadcast channel.

The content data D2 comes illustratively in MPEG-2 format. As such, the content data D2 is structured in 192-byte TTS packets each composed of a 188-byte TS (Transport Stream) packet supplemented with a 4-byte timestamp.

The tuner device 11 extracts the content data D2 and forwards the extracted content data D2 to the FIFO queue 12. The FIFO queue 12 stores the content data D2 in the order in which the data D2 has been supplied from the tuner device 11.

In accordance with a data discarding process, to be discussed later, the data control device 13 reads the content data D2 from the FIFO queue 12 and stores the retrieved data D2 into the buffer 13A. If it is found possible to write the content data D2 from the buffer 13A to the FIFO queue 14A of the encryption device 14, then the data control device 13 reads the content data D2 from the buffer 13A and writes it to the FIFO queue 14A.

With the content data D2 placed in the FIFO queue 14A, the encryption device 14 may illustratively encrypt, as the payload, 1,920 bytes of content data D2, i.e., the size of an integer multiple of 192 bytes constituting the data size of the TTS packet. The encryption device 14 outputs the encrypted data D3 thus obtained through encryption to the HTTP/TCP interface device 15.

Every time the encrypted data D3 is received from the encryption device 14, the HTTP/TCP interface device 15 outputs the data D3 to the receiving apparatus 4.

In the manner described above, the content transmitting apparatus 3 transmits the content data D2 in real time to the receiving apparatus 4 using HTTP/TCP, the content data D2 being distributed by the broadcasting station 2.

[3-2. Data Discarding Process]

The data discarding process performed principally by the data control device 13 will now be explained in detail.

The data control device 13 successively checks the remaining capacity of the FIFO queue 12. If the remaining capacity of the FIFO queue 12 is found larger than the threshold value, then the data control device 13 reads the content data D2 of the payload length (1,920 bytes) to be encrypted by the encryption device 14, from the FIFO queue 12 into the buffer 13A.

The data control device 13 then checks to determine whether the content data D2 placed in the buffer 13A begins at a halfway location into a TTS packet.

In the TTS packet, data "0x47" is stored at the 5th byte following the 4-byte timestamp. The data control device 13 thus checks to determine whether the 5th byte from the beginning of the content data D2 stored in the buffer 13A is "0x47."

Incidentally, in the third embodiment of the present invention, the buffer 13A functions as a FIFO queue from which the content data D2 is read on a first-in first-out basis. The capacity of the buffer 13A is 1,920 bytes equivalent to the payload length.

If the 5th byte from the beginning of the buffer 13A turns out to contain "0x47," the data control device 13 determines that the start of a TTS packet coincides with the beginning of the buffer 13A and that 10 TTS packets are stored in perfect condition within the buffer 13A.

On the other hand, if the 5th byte from the beginning of the buffer 13A is found to contain data other than "0x47," then the data control device 13 determines that halfway part of a TTS packet is stored starting from the beginning of the buffer 13A.

In this case, the data control device 13 searches for the address at which "0x47" is stored from the 6th byte on in the buffer 13A.

Illustratively, if the data control device 13 detects that the 100th byte from the beginning of the buffer 13A has "0x47," that means the TTS packet containing the detected "0x47" is stored starting from the 96th byte, i.e., 4 bytes ahead of the 100th byte.

Thus if "0x47" is detected at the 100th byte from the beginning of the buffer 13A, then the data control device 13 shifts the content data D2 ranging from the 96th byte of the buffer 13A to the last address, in such a manner that the content data D2 will begin from the starting address of the buffer 13A.

Through the data shift, the data control device 13 makes the start of a TTS packet coincide with the beginning of the buffer 13A, the data "0x47" being located at the 5th byte from the beginning of the buffer 13A.

If the data "0x47" is detected at the 100th byte from the beginning of the buffer, then the data control device 13 discards the content data D2 ranging from the starting address of the buffer to the 95th byte.

Then the data control device 13 reads anew 95-byte content data D2 having the same data size as that of the discarded data, and writes the newly retrieved data after the shifted content data D2 in the buffer 13A. This allows the data control device 13 to store 10 TTS packets in perfect condition in the buffer 13A.

As described, after reading the content data D2 composed of 10 TTS packets in perfect condition from the FIFO queue 12, the data control device 13 attaches the time-out condition of a predetermined time period to the retrieved content data D2 in preparation for writing to the FIFO queue 14A of the encryption device 14.

The encryption device 14 encrypts in AES-CBC mode the 1,920-byte content data D2 written to the FIFO queue 14A by the data control device 13. The encrypted data D3 obtained through encryption is transmitted by the encryption device 14 to the receiving apparatus 4 via the HTTP/TCP interface device 15.

Meanwhile, a lowered transfer speed via the network NT may cause the data control device 13 to develop a delay in transmitting the encrypted data D3. In such a case, a time-out may occur.

If that happens, the data control device 13 discards the 1,920-byte content data D2 read from the FIFO queue 12 without writing the retrieved data D2 to the encryption device 14.

If the remaining capacity of the FIFO queue 12 becomes smaller than the threshold value illustratively due to a delay via the network NT, then the data control device 13 reads and discards the 1,920-byte content data D2 from the FIFO queue 12, without writing the retrieved data D2 to the FIFO queue 14A of the encryption device 14.

Incidentally, when encrypting in AES-CBC mode the 1,920-byte content data D2, the encryption device 14 can proceed with the encryption without supplementing the content data D2 with padding data. This is because 1,920 bytes turn out to be an integer multiple of 16 bytes constituting the block size.

[3-3. Data Discarding Routine]

Figure 7:
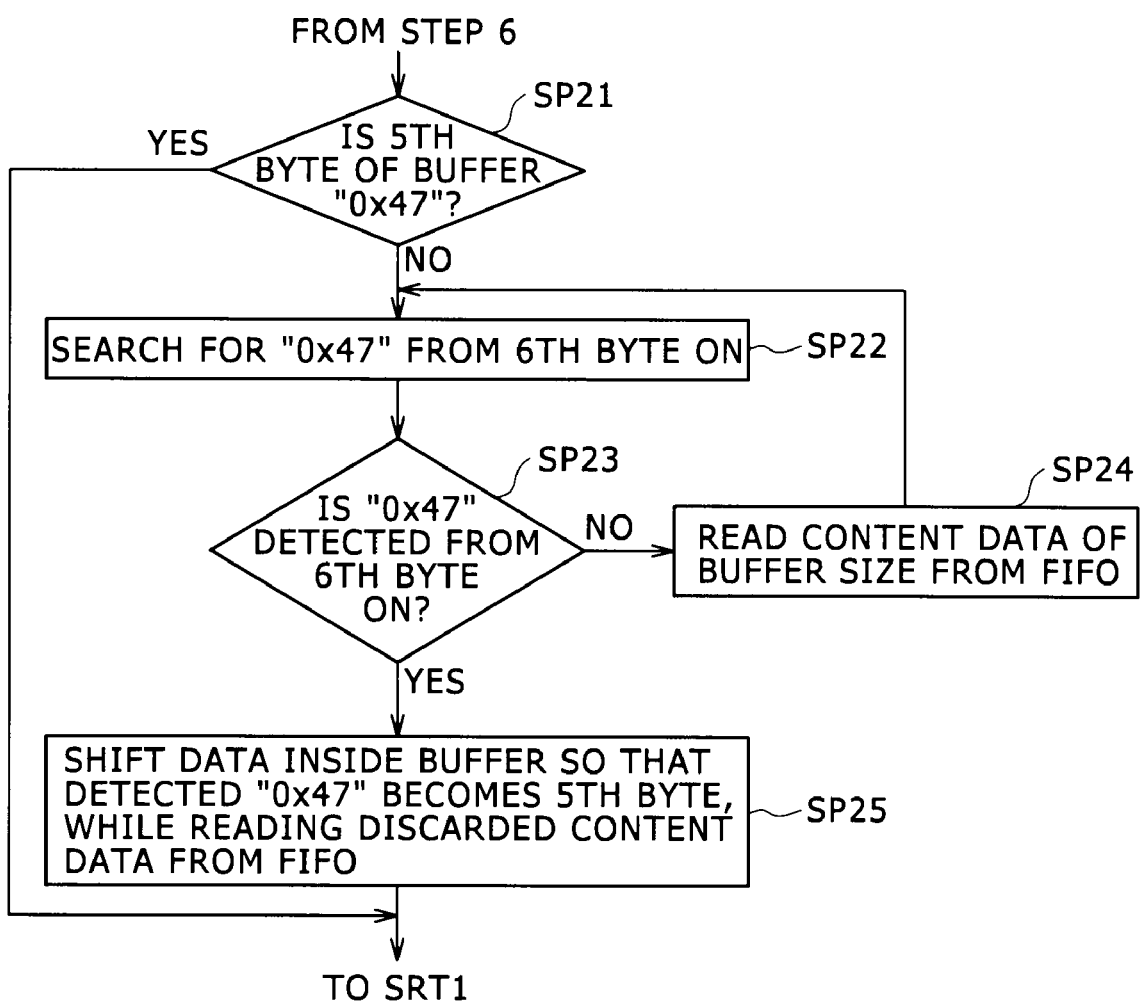
FIG. 7 is a flowchart explanatory of a TTS packet detecting routine.

What follows is an explanation of the routine for executing the above-described data discarding process. The data control device 13 of the third embodiment carries out the process in accordance with the data discarding routine (FIG. 3) used by the first embodiment, and additionally in keeping with a TTS packet detecting routine (shown in FIG. 7) between step SP6 and the subroutine SRT1.

In practice, as with the first embodiment, the data control device 13 starts up the routine RT1 (FIG. 4) and performs steps SP1 through SP5, before going to step SP6.

In step SP6, the data control device 13 reads, from the FIFO queue 12, illustratively 1,920-byte content data D2 constituting an integer multiple of a TTS packet, and writes the retrieved data D2 to the buffer 13A. The data control device 13 then enters the TTS packet detecting routine (FIG. 7) and reaches step SP21.

In step SP21, the data control device 13 checks to determine whether the 5th byte from the beginning of the buffer 13A is "0x47." If the result of the check in step SP21 is affirmative, that means all TTS packets are stored in perfect condition in the buffer 13A. In this case, the data control device 13 goes to the next subroutine SRT1.

On the other hand, if the result of the check in step SP21 is negative, that means the content data D2 is stored in the buffer 13A starting from a halfway location into a TTS packet. In this case, the data control device 13 goes to step SP22.

In step SP22, the data control device 13 searches for the address where the data "0x47" is stored from the 6th byte on in the buffer 13A. From step SP22, the data control device 13 goes to step SP23.

In step SP23, the data control device 13 checks to determine whether the address containing the data "0x47" is detected from the 6th byte onward in the buffer 13A.

With the third embodiment, the result of the check in step S23 cannot be negative since the capacity of the buffer 13A is 10 times the data size of a TTS packet. However, if the capacity of the buffer 13A is smaller than 192 bytes, i.e., the data size of the TTS packet, then the result of the check in step SP23 may turn out to be negative. In this case, the data control device 13 goes to step SP24.

In step SP24, the data control device 13 again reads from the FIFO queue 12 the content data D2 of which the size is equal to that of the buffer. From step SP24, the data control device 13 returns to step SP22. In this case, the data control device 13 discards the content data D2 stored previously in the buffer 13A, and overwrites the buffer 13A with the reread content data D2 for storage.

If the result of the check in step SP23 is affirmative, that means the content data D2 is stored in the buffer 13A starting from a halfway location into a TTS packet. In this case, the data control device 13 goes to step SP25.

In step SP25, the data control device 13 shifts the content data D2 inside the buffer 13A in such a manner that the data "0x47" detected in step SP23 will be placed at the 5th byte from the beginning of the buffer 13A.

Also, the data control device 13 reads from the FIFO queue 12 the content data D2 of which the size is that of the data discarded by the shift, writes the retrieved data after the shifted content data D2, and goes to the subroutine SRT1.

As with the first embodiment, the data control device 13 carries out the subroutine SRT1 (FIG. 5) and returns to step SP1.

[3-4. Operations and Effects]

Structured as described above, the content transmitting apparatus 3 of the third embodiment transmits to the receiving apparatus 4 the content data D2 distributed illustratively by the broadcasting station 2 using HTTP/TCP. During the transmission, the content transmitting apparatus 3 checks the remaining capacity of the FIFO queue 12 in which the content data D2 of interest has been accumulated.

If the remaining capacity of the FIFO queue 12 is found larger than the threshold value, the data control device 13 reads the content data D2 of which the size is an integer multiple of a TTS packet, from the FIFO queue 12 into the buffer 13A.

If the content data D2 read from the FIFO 12 into the buffer 13A turns out to be stored starting from a halfway location into a TTS packet in the buffer 13A, then the data control device 13 discards the imperfect TTS packet stored at the beginning of the buffer 13A.

The content transmitting apparatus 3 then reads from the FIFO queue 12 the content data D2 of which the size is that of the discarded data, and stores the retrieved data after the content data D2 that has not been discarded.

Thereafter, the content transmitting apparatus 3 makes preparations for writing the content data D2 read from the FIFO queue 12 to the encryption device 14 on the time-out condition. While a time-out has yet to occur, the content transmitting apparatus 3 writes the retrieved content data D2 to the encryption device 14.

The content transmitting apparatus 3 proceeds to have the encryption device 14 encrypting the content data D2 in AES-CBC mode. The encrypted data D3 obtained through encryption is output by the encryption device 14 to the receiving apparatus 4 via the HTTP/TCP interface device 15.

Meanwhile, if the remaining capacity of the FIFO queue 12 turns out to be less than the threshold value, that means there is a possibility that the FIFO queue 12 may overflow. In this case, the content transmitting apparatus 3 reads and discards the content data D2 of which the size is an integer multiple of a TTS packet from the FIFO queue 12.

Thus if a delay occurs due to status of the network NT during the transmission of the encrypted data D3, the content transmitting apparatus 3 may have the data control device 13 discarding the content data D2 before the data D2 is encrypted by the encryption device 14. In this manner, the content transmitting apparatus 3 can encrypt and transmit the content data D2 to the receiving apparatus 4 in keeping with status of the network NT.

Also, the content transmitting apparatus 3 has the data control device 13 writing only the TTS packets in perfect condition to the FIFO queue 14A of the encryption device 14, and has the encryption device 14 encrypting the received TTS packets in units of an integer multiple of a TTS packet before transmitting the encrypted TTS packets to the receiving apparatus 4.

As described, the content transmitting apparatus 3 does not transmit any TTS packets in imperfect condition to the receiving apparatus 4. This protects the receiving apparatus 4 against incurring errors in reading TTS packets.

As a result, the content transmitting apparatus 3 can prevent the receiving apparatus 4 from developing malfunctions and suppress the deterioration of picture quality due to the unavailability of data decryption.

The content transmitting apparatus 3 as the third embodiment offers the same effects as those provided by the content transmitting apparatus 3 constituting the first embodiment.

When structured as described above, the content transmitting apparatus 3 stores into the FIFO queue 12 the content data D2 distributed in streaming mode, reads the content data D2 from the FIFO queue 12 in the order in which the data D2 was written thereto, and has the encryption device 14 encrypting the retrieved data and transmitting the encrypted data to the receiving apparatus 4.

When the remaining capacity of the FIFO queue 12 becomes less than the threshold value depending on status of the network NT, the content transmitting apparatus 3 discards the content data D2 read from the FIFO queue 12.

This allows the content transmitting apparatus 3 to discard the content data D2 before encrypting it. In this manner, the content transmitting apparatus 3 can transmit the content data D2 in keeping with status of the network NT.

4. Fourth Embodiment

[4-1. Structure of the Content Transmitting Apparatus]

The FIFO queue 12, data control device 13, and encryption device 14 each constituted by software in the third embodiment are constituted by hardware in the fourth embodiment of the present invention.

Figure 8:
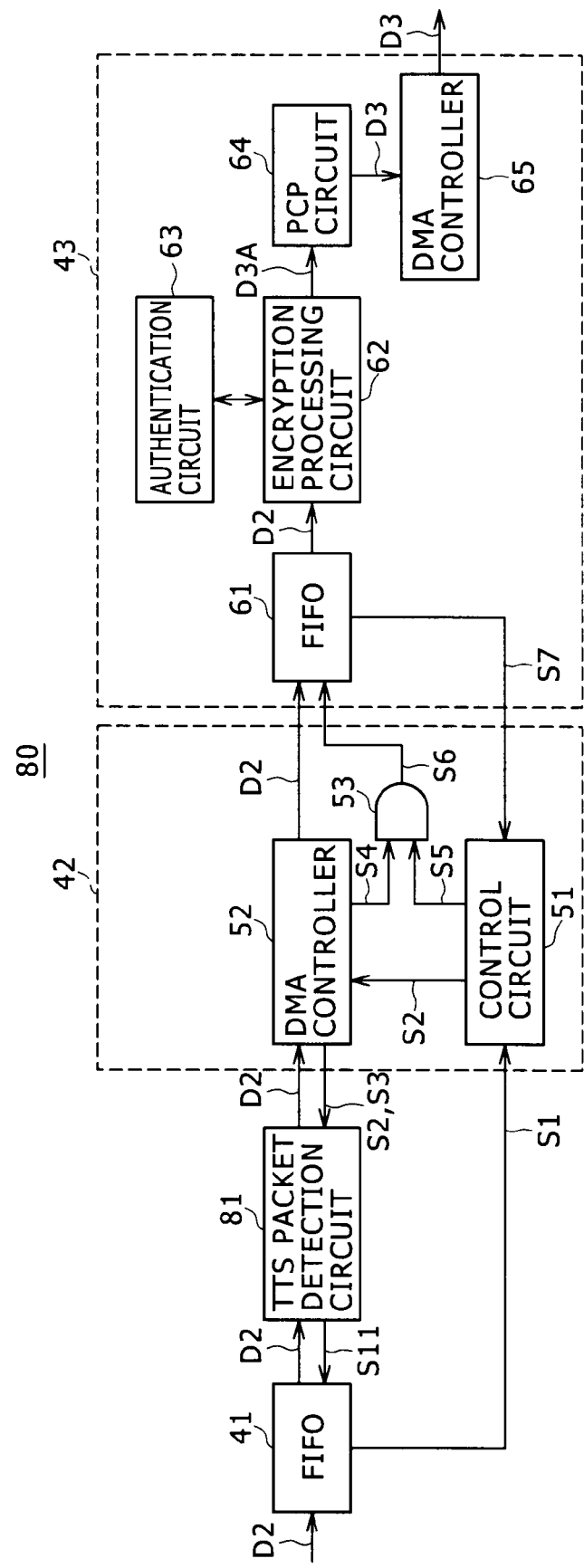
FIG. 8 is a schematic view showing a typical structure of the content transmitting apparatus as a fourth embodiment of the present invention.

In practice, a content transmitting apparatus 80 forming the fourth embodiment has the same structure as the second embodiment except that a TTS packet detection device 81 is interposed between the FIFO queue 41 and the DMA controller 52, as shown in FIG. 8. In FIG. 8, the components corresponding to those found in FIG. 6 are designated by like reference symbols.

Incidentally, the content transmitting apparatus 80 constituting the fourth embodiment is structurally the same as the content transmitting apparatus 3 making up the first embodiment except for the FIFO queue 41, TTS packet detection device 81, data control device 42, and encryption device 43. For this reason, the components identical to those provided in the first embodiment are omitted from the structure of FIG. 8.

The FIFO queue 41 stores the content data D2 in the order in which the data is being fed from the tuner device 11. Meanwhile, the control circuit 51 of the data control device 42 outputs the start signal S2 to the DMA controller 52 at predetermined intervals.

In turn, the DMA controller 52 sends the write increment signal S3 to the TTS packet detection circuit 81. At the same time, the DMA controller 52 forwards the start signal S2 coming from the control circuit 51 to the TTS packet detection circuit 81.

Upon receipt of the start signal S2 from the DMA controller 52, the TTS packet detection circuit 81 sends a read increment signal S11 to the FIFO queue 41. At a leading edge of the read increment signal S11, the TTS packet detection circuit 81 reads the content data D2.

If the 5th byte that has been retrieved turns out to be "0x47," the TTS packet detection circuit 81 reads, from the FIFO queue 41, illustratively 1,920 bytes of content data D2, i.e., the size of an integer multiple of a TTS packet.

If the retrieved 5th byte is something other than "0x47," then the TTS packet detection circuit 81 reads and discards the content data D2 from the FIFO queue 41 until the data "0x47" is detected.

Incidentally, when reading and discarding the content data D2 from the FIFO queue 41, the TTS packet detection circuit 81 retains the content data D2 that was in effect at least 4 bytes earlier than the currently retrieved content data D2.

When the data read from the FIFO queue 41 is found to be "0x47," the TTS packet detection circuit 81 reads 1,920 bytes of content data D2 starting from the location 4 bytes ahead of the data "0x47" from the FIFO 41.

This allows the TTS packet detection circuit 81 to read 10 TTS packets in perfect condition from the FIFO queue 41.

When reading the content data D2 from the TTS packet detection circuit 81 as described above, the DMA controller 52 can output 10 TTS packets in perfect condition to the FIFO queue 61 of the encryption device 43. At the same time, the DMA controller 52 outputs the write increment signal S4 to the FIFO queue 61.

Thereafter, as with the second embodiment, if neither the Almost_Full signal S1 from the FIFO queue 41 nor the full signal S7 from the FIFO queue 61 is supplied, then the control circuit 51 outputs to the write enable circuit 53 the write enable signal S5 indicative of "True."

At this point, the write enable circuit 53 sends the write increment signal S4 unmodified as the write increment signal S6 to the FIFO queue 61.

In turn, the DMA controller 52 writes the content data D2 to the FIFO queue 61 at a leading edge of the write increment signal S6 coming from the write enable circuit 53.

The encryption processing circuit 62 reads 1,920-byte content data D2 from the FIFO queue 61 and, using the content key supplied from the authentication circuit 63, encrypts the retrieved content data D2 in AES-CBC mode.

The PCP circuit 64 regards the encrypted data D3A fed from the encryption processing circuit 62 as the payload, and adds a header to the payload to generate a header-equipped PCP as the encrypted data D3.

The DMA controller 65 reads the encrypted data D3 generated by the PCP circuit 64, and writes the encrypted data D3 thus retrieved to the RAM 32.

The encrypted data D3 written to the RAM 32 is transmitted by the CPU 31 to the receiving apparatus 4 through the HTTP/TCP interface device 15 using HTTP/TCP.

On the other hand, if at least either the Almost_Full signal S1 from the FIFO queue 41 or the full signal S7 from the FIFO queue 61 is supplied, then the control circuit 51 outputs the write enable signal S5 indicative of "False" to the write enable circuit 53.

Upon receipt of the write enable signal S5 indicative of "False" from the control circuit 51, the write enable circuit 53 outputs the write increment signal S6 indicative of "False" to the FIFO queue 61. At this point, the DMA controller 52 cannot write to the FIFO queue 61 the content data D2 read from the FIFO queue 41 via the TTS packet detection circuit 81.

It follows that the DMA controller 52 can discard the content data D2 retrieved from the FIFO queue 41 via the TTS packet detection device 81 without writing the data D2 to the FIFO queue 61.

[4-2. Operations and Effects]

Structured as described above, the content transmitting apparatus 80 of the fourth embodiment transmits to the receiving apparatus 4 the content data D2 distributed illustratively by the broadcasting station 2 using HTTP/TCP. During the transmission, the content transmitting apparatus 3 stores the content data D2 temporarily into the FIFO queue 41.

The TTS packet detection circuit 81 reads the content data D2 of which the size is an integer multiple of a TTS packet from the location 4 bytes ahead of "0x47."

The DMA controller 52 outputs to the FIFO queue 61 the content data D2 retrieved by the TTS packet detection circuit 81, and sends the write increment signal S4 to the write enable circuit 53 at the same time.

If it is found possible to write the content data D2 to the FIFO queue 61, the control circuit 51 outputs the write enable signal S5 indicative of "True" to the write enable circuit 53. At this point, the write enable circuit 53 outputs the write increment signal S4 fed from the DMA controller 52 to the FIFO queue 61 as the write increment signal S6.

In turn, the DMA controller 52 writes the content data D2 at a leading edge of the write increment signal S6 sent from the write enable circuit 53.

If the remaining capacity of the FIFO queue 41 becomes less than the predetermined threshold value illustratively due to a delay via the network NT, then the FIFO queue 41 outputs the Almost_Full signal S1 to the control circuit 51 of the data control device 42. If the remaining capacity of the FIFO 61 is not large enough to accommodate the content data D2 of the payload length, the FIFO queue 41 outputs the full signal S7 to the control circuit 51.

If at least either the Almost_Full signal S1 from the FIFO queue 41 or the full signal S7 from the FIFO queue 61 is supplied, then the control circuit 51 sends the write enable signal S5 indicative of "False" to the write enable circuit 53.

Upon receipt of the write enable signal S5 indicating "False" from the control circuit 51, the write enable circuit 53 outputs the write increment signal S6 indicative of "False" to the FIFO queue 61.

At this point, the DMA controller 52 cannot write to the FIFO queue 61 the content data D2 retrieved from the FIFO queue 41. Thus the DMA controller 52 discards the content data D2 read from the FIFO queue 41 without writing the data D2 to the FIFO queue 61.

As described, if there occurs a delay in data transmission because of status of the network NT using HTTP/TCP, the content transmitting apparatus 80 may have the data control device 42 discarding the content data D2 before the encryption device 43 encrypts the data D2. In this manner, the content transmitting apparatus 80 can transmit the content data D2 in keeping with status of the network NT.

Also, the content transmitting apparatus 80 has the data control device 42 writing only the TTS packets in perfect condition to the FIFO queue 61 of the encryption device 43, and gets the encryption device 43 to transmit the TTS packets in units of an integer multiple of a TTS packet to the receiving apparatus 4.

Because the content transmitting apparatus 80 does not transmit TTS packets in imperfect condition to the receiving apparatus 4, the receiving apparatus 4 will not incur errors in reading the TTS packets. As a result, the content transmitting apparatus 80 can prevent the receiving apparatus 4 from developing malfunctions and suppress the deterioration of picture quality due to the unavailability of data decryption.

The content transmitting apparatus 80 as the fourth embodiment offers the same effects as those provided by the content transmitting apparatus 3 constituting the first embodiment.

5. Other Variations

[5-1. First Variation]

It was explained above that with the first embodiment of the invention, the content data D2 accumulated in the FIFO queue 12 is discarded in accordance with the data discarding routine.

However, this is not limitative of the present invention. Alternatively, the data control device 13 may discard the content data D2 in keeping with the data discarding routine shown in FIG. 9.

In practice, the data control device 13 starts up the routine RT2 and goes to step SP31.

In step SP31, the data control device 13 opens the encryption device 14 before going to step SP32. In step SP32, the data control device 13 designates the encryption device 14 as a non-block. From step SP32, the data control device 13 goes to step SP33.

In step SP33, the data control device 13 opens the FIFO queue 12 before going to step SP34.

In step SP34, the data control device 13 reads from the FIFO queue 12 the content data D2 of the payload length to be encrypted by the encryption device 14. From step SP34, the data control device 13 goes to step SP35.

In step SP35, the data control device 13 makes preparations for writing the content data D2 of the payload length which was read from the FIFO queue 12, to the FIFO queue 14A of the encryption device 14. From step SP35, the data control device 13 goes to step SP36.

In step SP36, the data control device 13 checks to determine whether the content data D2 of the payload length retrieved from the FIFO queue 12 can be written to the FIFO queue 14A of the encryption device 14. If the result of the check in step SP36 is affirmative, then the data control device 13 goes to step SP37.

In step SP37, the data control device 13 writes the content data D2 of the payload length retrieved in step SP34 to the FIFO queue 14A of the encryption device 14. From step SP37, the data control device 13 returns to step SP34.

On the other hand, if the result of the check in step SP36 turns out to be negative, that means the content data D2 cannot be written to the FIFO queue 14A of the encryption device 14. In this case, the data control device 13 goes to step SP38.

In step SP38, the data control device 13 acquires the remaining capacity of the FIFO queue 12 before going to step SP39. In step SP39, the data control device 13 checks to determine whether the remaining capacity of the FIFO queue 12 is less than a predetermined threshold value.

If the result of check in step SP39 is negative, that means the remaining capacity of the FIFO queue 12 is larger than the threshold value and that the content data D2 placed in the FIFO queue 12 is not likely to overflow. In this case, the data control device 13 returns to step SP36.

The data control device 13 repeats steps SP36, SP38, and SP39 either until it becomes possible to write the content data D2 to the FIFO queue 14A of the encryption device 14 or until the remaining capacity of the FIFO queue 12 becomes less than the threshold value.

On the other hand, if the result of the check in step SP39 turns out to be affirmative, that means the content data D2 cannot be written to the FIFO queue 14A of the encryption device 14, with the remaining capacity of the FIFO queue 12 getting less than the threshold value.

At this point, there is a possibility that the content data D2 accumulated in the FIFO queue 12 can overflow. The data control device 13 thus returns to step SP34 and reads new content data D2 of the payload length from the FIFO queue 12.

As described, if the content data D2 cannot be written to the FIFO queue 14A of the encryption device 14, with the remaining capacity of the FIFO queue 12 getting less than the threshold value, then the data control device 13 discards the content data D2 in question and reads new content data D2.

Thus if the transmission of the content data D2 is delayed illustratively due to status of the network, the data control device 13 can discard the content data D2 before it is encrypted by the encryption device 14.

Figure 9:
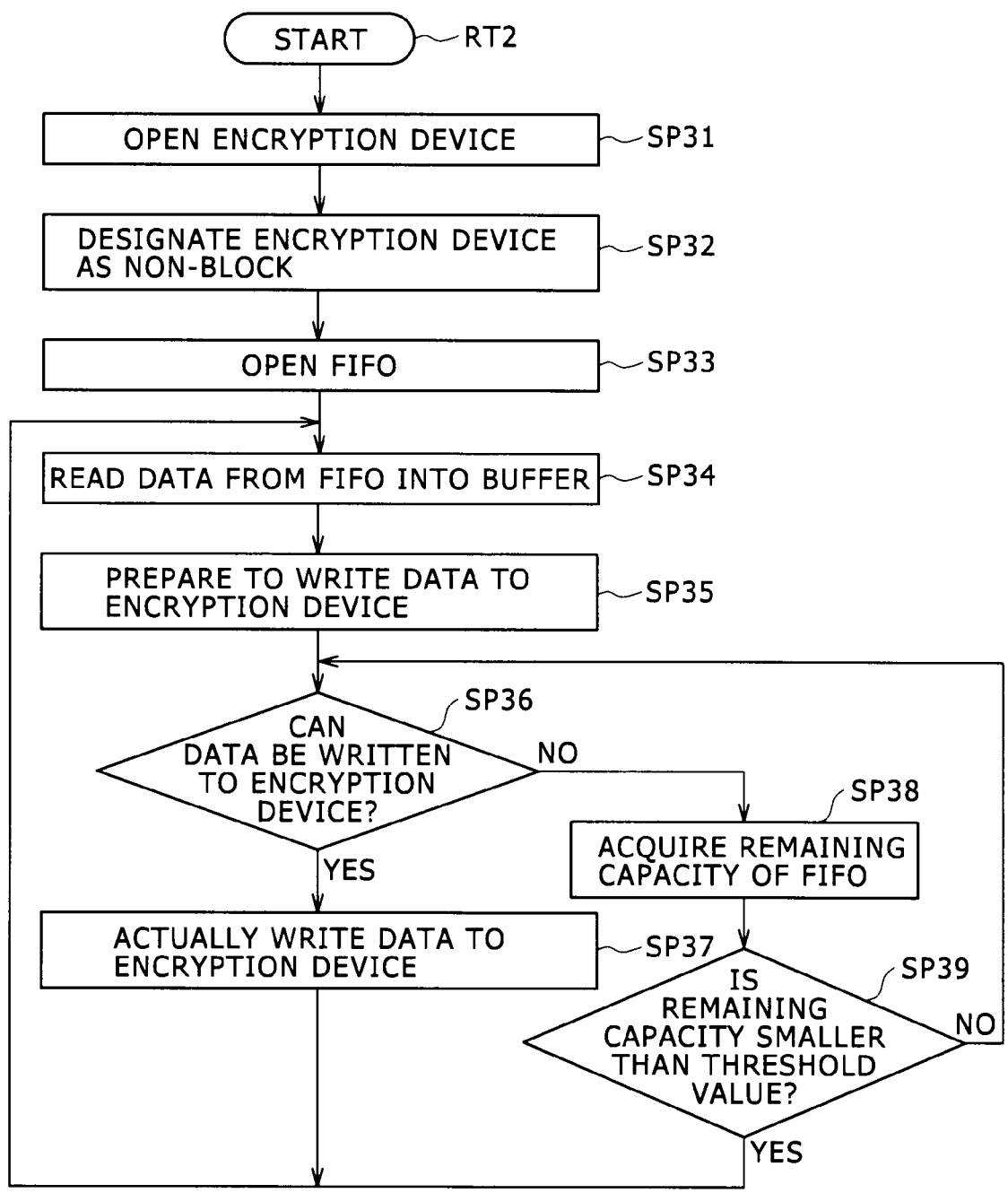
FIG. 9 is a flowchart explanatory of a data discarding routine as another embodiment of the present invention.

With the third embodiment of the present invention, it is also possible to make arrangements to discard the content data D2 in accordance with the above-described data discarding routine (FIG. 9).

In this case, the data control device 13 in step SP34 reads from the FIFO 12 the content data D2 of which the size is an integer multiple of a TTS packet and which is to be encrypted by the encryption device 14. Between step SP34 and step SP35, the data control device 13 need only carry out the TTS packet detecting routine shown in FIG. 7.

[5-2. Second Variation]

It was explained above that with the first and the second embodiments of the invention, the content data D2 is discarded in units of an integer multiple of 16 bytes constituting the block size suitable for encryption in AES-CBC mode based on the DTCP-IP standard.

With the third and the fourth embodiments, it was also explained, the content data D2 is discarded in units of an integer multiple of 192 bytes making up the data size of a TTS packet.

That is, with the first through the fourth embodiments, the content data D2 of the payload length is discarded in units of the payload length suitable for encryption by the encryption device 14 or 43.

However, these structures are not limitative of the present invention. Alternatively, with the first and the second embodiments, the content data D2 placed in the FIFO queue 12 may be read and discarded by the data control device 13 or 42 in units of any desired data size.

With the third and the fourth embodiments, the content data D2 stored in the FIFO queue 12 may be read and discarded in units of any desired data size, provided the data control device 13 or 42 makes arrangements to write the TTS packets in perfect condition to the encryption device 14 or 43.

Illustratively, when the remaining capacity of the FIFO queue 12 or 41 becomes less than the threshold value, the data control device 13 or 42 reads and discards the content data D2 from the FIFO queue 12 or 41 in units of a TTS packet.

Parenthetically, Japanese Patent Laid-open No. 2008-199435 proposes a content transmitting apparatus that encrypts the content data supplied illustratively by a broadcasting station and stores the encrypted data into a buffer. When the amount of the encrypted content data placed in the buffer is found to exceed a predetermined quantity, the content transmitting apparatus discards the content data in question.

The proposed content transmitting apparatus discards the encrypted content data in a single unit so as to prevent the encrypted content data from getting transmitted partially to a receiving apparatus. It follows that this content transmitting apparatus needs to be equipped with a large-sized buffer for accommodating the encrypted content data in a unit.

By contrast, the content transmitting apparatus 3 or 40 according to the present embodiment stores the content data D2 fed from the broadcasting station 2 into the FIFO queue 12 or 41 prior to encryption. When the remaining capacity of the FIFO queue 12 or 41 becomes less than the threshold value, the content transmitting apparatus 3 or 40 reads and discards an appropriate size of content data D2 from the FIFO queue 12 or 41.

This structure enables the content transmitting apparatus 3 or 40 to reduce the size of the FIFO queue 12 or 41.

[5-3. Third Variation]

It was explained above that with the first and the second embodiments of the invention, the content data D2 is discarded in units of an integer multiple of 16 bytes constituting the block size suitable for encryption in AES-CBC mode based on the DTCP-IP standard.

With the third and the fourth embodiments, it was also explained, the content data D2 is discarded in units of an integer multiple of 192 bytes making up the data size of a TTS packet.

However, the structures above are not limitative of the present invention. Alternatively, when the remaining capacity of the FIFO queue 12 or 41 becomes less than the threshold value, the content data D2 held in the FIFO queue 12 or 41 may be discarded in units of a frame.

It is known that MPEG-2 data is constituted in units of a GOP (Group Of Pictures) each composed of a plurality of frames including I, P, and B pictures. The I picture is a picture that may be decrypted independently of any other frame. The P picture is a picture that cannot be decrypted alone; it can be decrypted only in reference to I pictures. The B picture is a picture that can only be decrypted in reference to I and P pictures.

Under the above constraints, when the remaining capacity of the FIFO queue 12 or 41 becomes less than the threshold value, the data control device 13 or 42 may illustratively reference PES headers as well as internal headers in elementary streams so as to discard only the TTS packets corresponding to the P and B pictures while keeping intact the TTS packets corresponding to the I pictures.

[5-4. Fourth Variation]

It was explained above that with the first and the third embodiments of the invention, the FIFO queue 12, data control device 13, and encryption device 14 are constituted by software. With the second and the fourth embodiments, it was also explained, the FIFO queue 41, data control device 42, and encryption device 43 are constituted by hardware.

However, the structures above are not limitative of the present invention. Alternatively, the FIFO queue may be constituted by hardware and the data control device and encryption device by software. As another alternative, the FIFO queue, data control device, and encryption device may each be constituted either by software or by hardware.

[5-5. Fifth Variation]

It was explained above that with the first through the fourth embodiments of the invention, the content data D2 transmitted from the broadcasting station 2 is transmitted in real time to the receiving apparatus 4.

However, this structure is not limitative of the present invention. Alternatively, the present embodiment may also be applied to the case where the picture data acquired illustratively by a digital video camera is transmitted in real time to the receiving apparatus 4 via a suitable interface (not shown).

As another alternative, the present embodiment may be applied to the case where CG (Computer Graphics) moving pictures created illustratively by personal computer is acquired via a suitable interface and transmitted in real time to the receiving apparatus 4.

As described, the present embodiment applies to diverse cases where the picture data supplied by various home appliances, by PC, or via the Internet is transmitted in real time to the receiving apparatus 4.

[5-6. Sixth Variation]

It was explained above that with the first through the fourth embodiments of the invention, the content data D2 in MPEG-2 format is transmitted in real time to the receiving apparatus 4.

Alternatively, the present embodiment may also apply where content data in diverse formats is transmitted to the receiving apparatus 4.

[5-7. Seventh Variation]

It was explained above that with the first and the second embodiments of the invention, the content data D2 is discarded in units of an integer multiple of 16 bytes constituting the block size suitable for encryption in AES-CBC mode based on the DTCP-IP standard.

With the third and the fourth embodiments, it was also explained, the content data D2 is discarded in units of an integer multiple of 192 bytes constituting the data size of a TTS packet.

That is, with the first through the fourth embodiments of the invention, it was explained that the content D2 is discarded in units of a fixed length.

Alternatively, the size of the content data D2 to be discarded by the data control device 13 or 42 may be varied.

More specifically, the data control device 13 of the content transmitting apparatus 3 as the first embodiment may be arranged to bring about changes in the size of the content data D2 to be discarded.

Illustratively, the data control device 13 may be arranged to provide picture quality priority mode and real-time priority mode, either of which may be selected by operations performed by the user.

If picture quality priority mode is selected by the user's operation and if the remaining capacity of the FIFO queue 12 becomes less than the threshold value, then the data control device 13 may discard the TTS packets corresponding to P and B pictures while retaining the TTS packets corresponding to I pictures.

The above-mentioned picture quality priority mode enables the content transmitting apparatus 3 to transmit the TTS packets corresponding to I pictures to the receiving apparatus 4. Although the number of frames is reduced, the user is offered the content of which the picture quality per frame remains high.

If real-time priority mode is selected by the user's operation and if the remaining capacity of the FIFO queue 12 drops below the threshold value, then the data control device 13 may discard the content data in such a manner as to reduce the data size per frame while keeping the number of frames intact.

This allows the content transmitting apparatus 3 to provide the receiving apparatus 4 with the content data of which the number of frames remains unchanged.

As another alternative, the data control device 13 may be arranged to change the data size of the content data D2 to be discarded, in accordance with the format type of the content data D2 stored in the FIFO queue 12.

Illustratively, if the content data D2 in MPEG-2 format is placed in the FIFO queue 12 and if the remaining capacity of the FIFO queue 12 becomes less than the threshold value, the data control device 13 may discard the content data D2 in units of a frame.

If the content data D2 stored in the FIFO queue 12 is in a format other than that formed by packets and if the remaining capacity of the FIFO queue 12 becomes less than the threshold value, the data control device 13 reads and discards the content data D2 from the FIFO queue 12 in units of the payload length to be encrypted by the encryption device 14.

As described, the data control device 13 may be arranged to change the data size of the content data to be discarded in accordance with the format type of the content data D2 placed in the FIFO queue 12.

Instead of the data control device 13 changing the data size of the content data D2 to be discarded, there may alternatively be provided, apart from the data control device 13, a switching device for changing the data size of the content data D2 to be discarded.

[5-8. Eighth Variation]

It was explained above that with the first and the third embodiments of the invention, the CPU 31 performs the above-described data discarding process in accordance with the data discarding routine stored in the ROM 33.

However, this is not limitative of the present invention. Alternatively, the data discarding process may be carried out in keeping with a data discarding routine installed from storage media or downloaded over the Internet.

As another alternative, the data discarding process may be executed using a data discarding routine installed through any one of other diverse routes.

[5-9. Ninth Variation]

It was explained above that with the first through the fourth embodiments of the invention, the tuner device 11 is provided as the acquisition device. Alternatively, the acquisition device may be constituted otherwise according to the present embodiment.

With the first through the fourth embodiments of the invention, it was also explained, the FIFO queue 12 or 41 is provided as the temporary storage device. Alternatively, the temporary storage device may be constituted otherwise according to the present embodiment.

It was further explained above that with the first through the fourth embodiments of the invention, the data control device 13 or 42 is provided as the data control device. Alternatively, the data control device may be constituted otherwise according to the present embodiment.

With the first through the fourth embodiments of the invention, it was further explained, the encryption device 14 or 43 is provided as the encryption device. Alternatively, the encryption device may be constituted otherwise according to the present embodiment.

It was also explained above that with the first through the fourth embodiments of the invention, the HTTP/TCP interface device 15 is provided as the transmission device. Alternatively, the transmission device may be constituted otherwise according to the present embodiment.

From the viewpoint of industrial applicability, the present embodiment may be adapted illustratively to encrypting the content data distributed in streaming mode and transmitting the encrypted content data to a receiving apparatus.

The present application contains subject matter related to that disclosed in Japanese Priority Patent Application JP 2009-097205 filed with the Japan Patent Office on Apr. 13, 2009, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A content transmitting apparatus, comprising:
an acquisition device configured to acquire content data distributed in streaming mode;
a temporary storage device configured to store temporarily the content data acquired by said acquisition device;
a data control device configured to read the content data from said temporary storage device on a first-in first-out basis;
an encryption device configured to encrypt in units of a predetermined amount the content data read out by said data control device; and
a transmission device configured to transmit the content data encrypted by said encryption device to a predetermined receiving apparatus via a network;
wherein, if the remaining capacity of said temporary storage device becomes smaller than a predetermined threshold value depending on status of said network, then said data control device discards the content data read from said temporary storage device by deleting the content data from the temporary storage device without transmitting the content data to the predetermined receiving apparatus, the data control device discarding the content data one frame at a time if the content data is in MPEG-2 format, and the data control device discarding the content data one unit of data as encrypted by the encryption device if the content data is not in MPEG-2 format.

2. The content transmitting apparatus according to claim 1, wherein said transmission device transmits to said receiving apparatus the content data encrypted by said encryption device using Hyper Text Transmission Protocol/Transmission Control Protocol known as HTTP/TCP.

3. The content transmitting apparatus according to claim 2, wherein said data control device changes the amount of the content data to be discarded in accordance with the quality at which the content data in question is reproduced by said receiving apparatus.

4. The content transmitting apparatus according to claim 2, wherein said content data is made up of Timestamped Transport Stream packets namely, Transport Stream packet added to timestamp, each known as a TTS packet, and TS packet respectively; and said data control device discards said content data in units of said TTS packet.

5. The content transmitting apparatus according to claim 4, wherein said encryption device encrypts said content data in units of an integral multiple of said TTS packet.

6. The content transmitting apparatus according to claim 1, wherein said data control device discards P and B frames only and does not discard I frames if the content data is in MPEG-2 format.

7. A content transmitting method, comprising:
acquiring content data distributed in streaming mode;
temporarily storing the content data acquired in said acquiring step into a temporary storage device;
data controlling, reading the content data from said temporary storage device on a first-in first-out basis;
encrypting in units of a predetermined amount the content data read out in said data controlling step; and
transmitting the content data encrypted in said encrypting step to a predetermined receiving apparatus via a network;
wherein, if the remaining capacity of said temporary storage device becomes smaller than a predetermined threshold value depending on status of said network, then said data controlling step involves discarding the content data read from said temporary storage device by deleting the content data from the temporary storage device without transmitting the content data to the predetermined receiving apparatus, the discarding including discarding the content data one frame at a time if the content data is in MPEG-2 format, and discarding the content data one unit of data as encrypted by the encrypting if the content data is not in MPEG-2 format.

8. The content transmitting method according to claim 7, wherein said discarding discards P and B frames only and does not discard I frames if the content data is in MPEG-2 format.

9. A non-transitory computer readable recording medium which stores a content transmitting program for causing a computer to execute a process comprising:
  acquiring content data distributed in streaming mode;
  temporarily storing the content data acquired in said acquiring step into a temporary storage device;
  data controlling, reading the content data from said temporary storage device on a first-in first-out basis;
  encrypting in units of a predetermined amount the content data read out in said data controlling step; and
  transmitting the content data encrypted in said encrypting step to a predetermined receiving apparatus via a network;
  wherein, if the remaining capacity of said temporary storage device becomes smaller than a predetermined threshold value depending on status of said network, then said data controlling step involves discarding the content data read from said temporary storage device by deleting the content data from the temporary storage device without transmitting the content data to the predetermined receiving apparatus, the discarding including discarding the content data one frame at a time if the content data is in MPEG-2 format, and discarding the content data one unit of data as encrypted by the encrypting if the content data is not in MPEG-2 format.

10. The non-transitory computer readable medium according to claim 9, wherein said discarding discards P and B frames only and does not discard I frames if the content data is in MPEG-2 format.

11. A content transmitting apparatus, comprising:
  acquisition means for acquiring content data distributed in streaming mode;
  temporary storage means for storing temporarily the content data acquired by said acquisition means;
  data control means for reading the content data from said temporary storage means on a first-in first-out basis;
  encryption means for encrypting in units of a predetermined amount the content data read out by said data control means; and
  transmission means for transmitting the content data encrypted by said encryption means to a predetermined receiving apparatus via a network;
  wherein, if the remaining capacity of said temporary storage means becomes smaller than a predetermined threshold value depending on status of said network, then said data control means discards the content data read from said temporary storage means by deleting the content data from the temporary storage means without transmitting the content data to the predetermined receiving apparatus, the data control means discarding the content data one frame at a time if the content data is in MPEG-2 format, and the data control means discarding the content data one unit of data as encrypted by the encryption means if the content data is not in MPEG-2 format.

12. The content transmitting apparatus according to claim 11, wherein said data control means discards P and B frames only and does not discard I frames if the content data is in MPEG-2 format.

* * * * *